INVENTORS
LAWRENCE J. HALL
ROBERT MAYER
EINAR T. YOUNG
BY
Donald R. Johnson
ATTORNEY

United States Patent Office 3,435,238
Patented Mar. 25, 1969

3,435,238
CATALYST ANALYSIS APPARATUS
Lawrence J. Hall, Sarnia, Ontario, Canada, and Robert Mayer, Ardmore, and Einar T. Young, Newtown Square, Pa. assignors to Sun Oil Company, Philadelphia, Pa., a corporation of Pennsylvania
Filed Jan. 28, 1965, Ser. No. 428,800
Int. Cl. G01n 21/26; H01j 39/12; B01j 9/00
U.S. Cl. 250—218          16 Claims

ABSTRACT OF THE DISCLOSURE

A sample of catalyst is taken from a catalyst flowline and the color of the sample is compared with the color of a standard, to produce on a chart a record indicative of the amount of coke on the catalyst sample. This procedure is repeated automatically, in a cyclic and periodic manner.

---

This invention relates to catalyst analysis apparatus, and more particularly to apparatus for measuring the percentage of carbon (in the form of coke) on the catalyst used in a cracking process.

In a petroleum refinery catalytic cracker which is rather widely used, a clay-type catalyst is used in the reactor. This catalyst absorbs some of the carbon atoms which are freed in the hydrocarbon cracking process. The "coked" catalyst is passed through one or more kilns, where oxygen is used to burn the coke off or "regenerate" the catalyst, so that it can be used over and over.

For various reasons, it has been found undesirable to burn off (in the kiln or regenerator) 100% of the coke, and it is common practice to leave a small amount of coke on the catalyst. This is called "residual carbon," and varies from 0.1% to 0.4% during normal operation of the cracker.

It is necessary to know the amount of residual carbon on the catalyst coming from the kiln (i.e., from the regenerative section of the catalytic cracker), in order to be able to properly adjust (for optimum operation of the cracker) the amount of air going to the kiln. Also, for automatic control of a catalytic cracker, the amount of residual carbon on the catalyst is one of the parameters which must be known.

A visual (optical) correlation exists between the percentage of residual carbon and the degree of darkness or lightness of the catalyst (i.e., between the percentage of carbon and the light-reflecting properties of the catalyst), provided the catalyst sample is pulverized.

According to prior practice, to determine the percentage of coke on the catalyst it was necessary for the operator to obtain a sample of catalyst from the kiln transfer line, then manually pulverize it, pour it into a sample cell, and compare it visually with a set of standards. A single analysis took the operator at least twenty minutes and was a hot, tedious operation. This operation was necessary four times per shift, and in addition was required every half four on startups, and when the crude feed rate (to the cracker) was changed. It may be seen that these manual analyses consumed a large amount of operator time, on the order of one man's full time per year.

In addition, the human eye varies in its sensitivity and judgment of brightness from individual to individual, thus causing errors and variations in the results.

An object of this invention is to provide an automatically-operating apparatus for measuring the amount of coke on a catalyst.

Another object is to provide an apparatus which automatically and accurately measures the percentage of residual carbon on a hydrocarbon cracking catalyst.

A further object is to provide an apparatus which automatically and continuously (in a periodic manner) measures the percentage of coke on the catalyst used in a continuous cracking process.

The objects of this invention are accomplished, briefly, in the following manner: A valved conduit is coupled to the catalyst bottom seal leg portion of a continuously-operating catalytic cracker. The valve in the conduit is automatically opened to allow a fresh sample of hot pelletized catalyst to flow along the sample conduit. By the programmed operation of other valves, a portion of this total sample is trapped in a smaller pipe and is held there until it cools to a substantially lower temperature. After it cools, this (small) sample portion is pulverized and fed to an analyzer in which the light-reflecting properties of the sample are compared with those of a reference standard; the analyzer produces an output signal proportional to the percentage of coke on the sample being analyzed. This signal is amplified and recorded. The entire sampling and analyzing cycle is repeated periodically (say at fifteen-minute intervals), the periodicity being established by a programming device.

A detailed description of the invention follows, taken in conjunction with the accompanying drawings, wherein.

Figure 1:
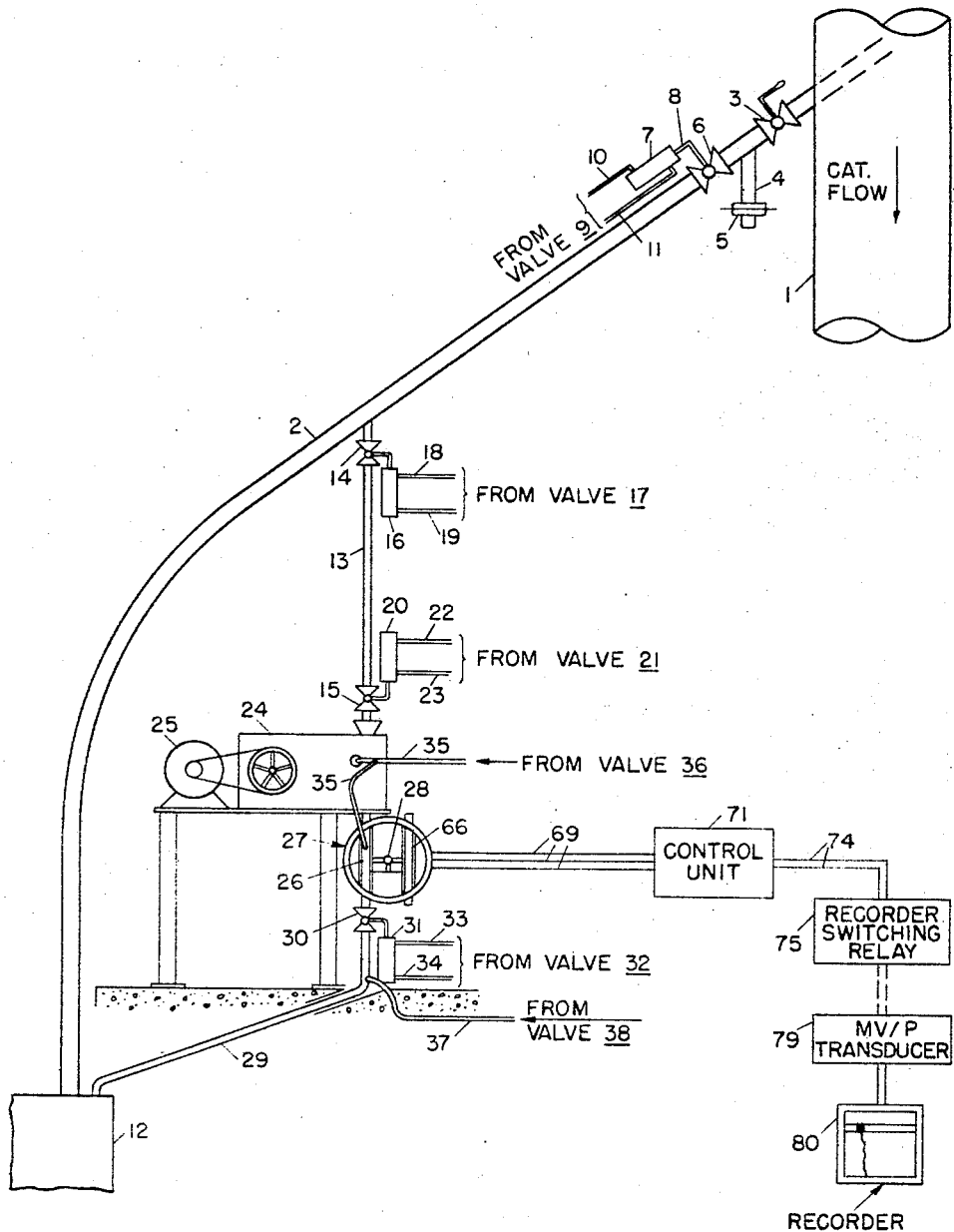
FIG. 1 is a schematic diagram of a catalyst analysis apparatus according to this invention.

Refer first to FIG. 1. The pelletized catalyst whose residual carbon or coke content is to be measured is flowing downwardly in a flow line 1, in a continuous manner. Flow line 1, for example, may be the bottom seal leg which extends downwardly from the kiln or regenerator in a so-called Houdriflow catalytic cracker (H.C.C.). As is well known to those skilled in the art, the H.C.C. utilizes a continuous movement of catalyst; the catalyst, after being utilized to effect cracking in the reactor, moves downwardly from the bottom of the reactor through a kiln or regenerator, and then is returned to the upper end of the reactor. The apparatus of the present invention measures the percentage of carbon or coke on the catalyst after it has passed through the regenerator (i.e., the percentage of residual carbon on the catalyst).

The upper open end of an inclined side stream sample pipe or conduit 2 (which may be two inches in diameter, by way of example) extends into the flow line 1. Pipe 2 is inclined downwardly from this open end thereof, so that catalyst may move therethrough (in the direction away from line 1) in response to gravitational forces. Just outside flow line 1, a manual shutoff valve 3, which is open at all times when the apparatus of this invention is in operation, is provided in conduit 2. Just downstream from valve 3, a pipe 4 branches off from conduit 2 and extends vertically downwardly for a short distance. At the bottom end of branch 4, a manual sampling valve 5 is provided. Valve 5 enables a catalyst sample to be drawn off manually when such is desired; however, valve 5 is closed at all times during operation of the automatic analyzing apparatus.

Just downstream from the junction between pipes 2 and 4, an automatically-operated ball valve 6 is provided in pipe 2. Valve 6 is one of the four similarly-constructed valves which control the sequence of automatic sampling and analyzing; two additional valves are used for purging certain parts of the apparatus. The ball valve 6 is operated by the piston (not shown) in an air cylinder 7 through a link 8 which is mechanically coupled to the piston and to the valve. Air is supplied to cylinder 7 from a solenoid valve 9 (FIG. 2) selectively through a pair of pipes 10 and 11 for opening or closing the valve 6, air being supplied through one of these pipes to open the valve and through the other pipe to close the valve.

The solenoid valve 9, and also other items, are controlled from a programmer, which consists of a series of cams (driven by a constant speed motor) which operate microswitches at specific time intervals. The program can be made of any length, from ten minutes up to several hours, by choosing the appropriate set of gears for coupling the motor to the shaft which drives the cams. A fifteen-minute program will be described herein, by way of example.

Beyond or downstream from valve 6, the valved conduit 2 continues in its downward inclination, then curves into a substantially vertical direction for some distance, and the lower end of this conduit or side stream sample pipe empties into a catalyst sample waste bin 12.

The upper or upstream end of a substantially vertically-extending sample pipe 13 (which may be one inch in diameter, for example) is coupled into conduit 2 at a location downstream from valve 6, between this valve and the bin 12. An automatically-operated ball valve 14 (similar in construction to valve 6) is provided in pipe 13, near the upper end thereof, and another similar ball valve 15 is provided in pipe 13, near the lower or downstream end of this same pipe. Valve 14 is operated by the piston in an air cylinder 16, to which air is supplied from a solenoid valve 17 (FIG. 2) selectively through a pair of pipes 18 and 19 for opening or closing valve 14. Valve 15 is operated by the piston in an air cylinder 20, to which air is supplied from a solenoid valve 21 selectively through a pair of pipes 22 and 23 for opening or closing valve 15.

A pulverizer 24, driven by a motor 25, has its intake side coupled to the downstream or lower end of pipe 13, below valve 15.

The discharge from pulverizer 24 (i.e., the pulverized sample) feeds into the upper end of a sample holder 26 which forms a part of a detector unit 27. Sample holder 26 is simply a hollow cylinder or tube having therein a window through which may shine a beam of light from a lamp 28 which is also contained in detector unit 27.

The lower end of sample holder 26 is joined to the upper end of a catalyst sample effluent pipe 29, which extends downward toward bin 12; the lower end of pipe 29 empties into waste bin 12. An automatically-operated ball valve 30 (similar in construction to the valve 6) is provided in pipe 29, near the upper end of this pipe and just outside of the casing of detector unit 27. Valve 30 is operated by the piston in an air cylinder 31, to which air is supplied from a solenoid valve 32 (FIG. 2) selectively through a pair of pipes 33 and 34 for opening or closing valve 30.

It is pointed out that valves 6, 14, 15, and 30 are the four ball valves which control the sequence of automatic sampling and analyzing.

Figure 2:
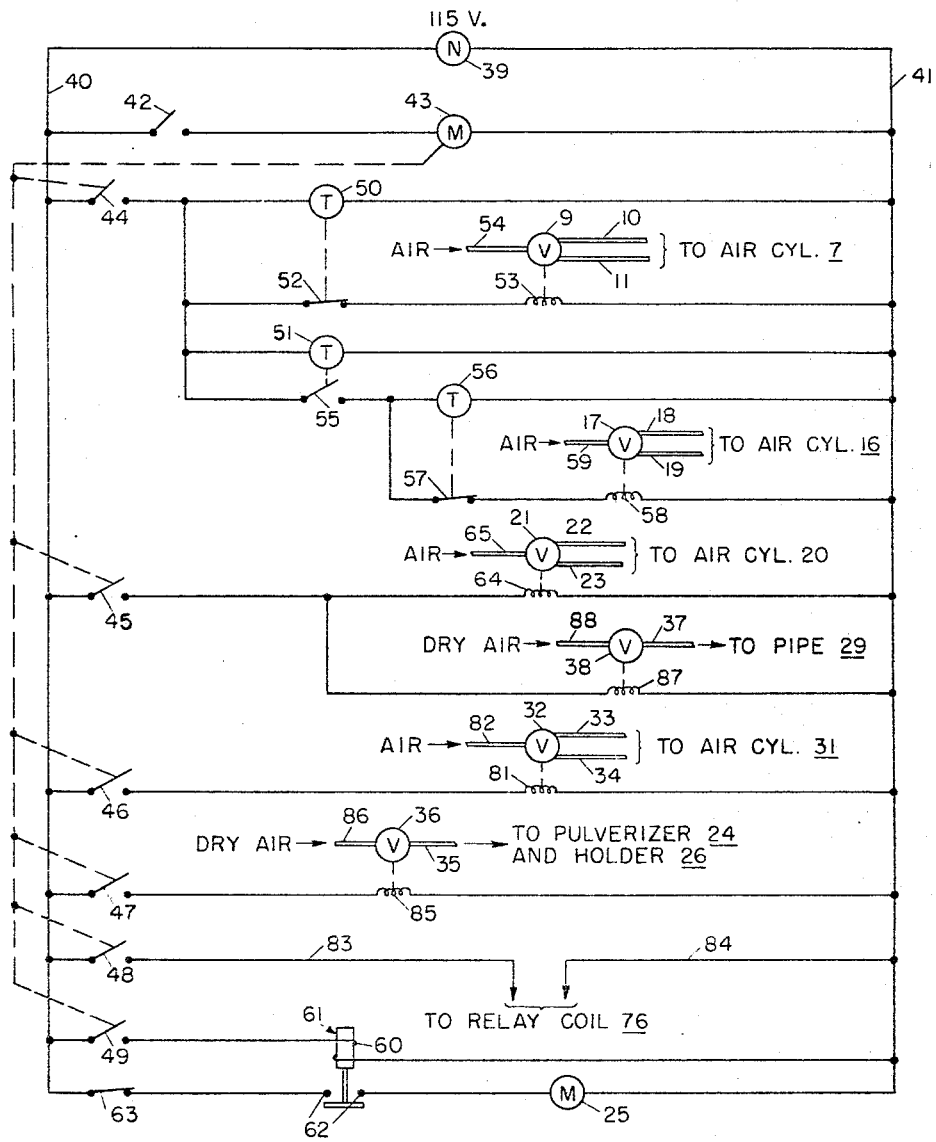
FIG. 2 is a circuit diagram of the programmer forming a part of the apparatus of the invention.

A purging line 35 is connected to the pulverizer 24 and sample holder 26. A stream of dry air for purging is supplied to line 35 from a solenoid valve 36 (FIG. 2). A purging line 37 is connected to the upper end of the effluent pipe 29. A stream of dry air for purging is supplied to line 37 from a solenoid valve 38.

Figure 3:
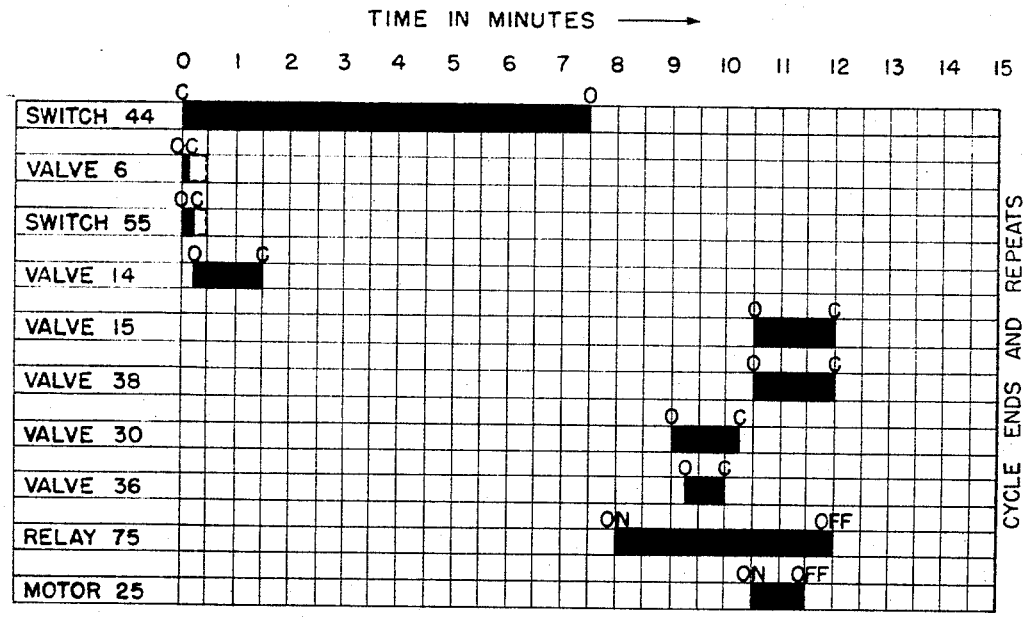
FIG. 3 is a time plot illustrating one cycle of operation of the programmer.

Valves 36, 38, 32, 21, 17, and 9 (and thus, of course, also the ball valves 6, 14, 15 and 30) are all controlled from a programmer the circuit of which is shown in FIG. 2 and the operation of which (for a fifteen-minute cycle) is illustrated by FIG. 3.

A suitable source 39 of 115-volt A.C. power is connected between the two power buses 40 and 41. A manually-operated switch 42, which is connected in series with a motor 43 between buses 40 and 41, is closed to put the programmer into operation. Motor 43 is the constant speed motor (previously referred to) which drives a series of six cams each of which operates a respective microswitch. For simplicity, only the six microswitches 44, 45, 46, 47, 48, and 49 are illustrated in FIG. 2; the dotted-line connections from switches 44–49 to motor 43 indicate that the operation of these switches is timed, under the control of motor 43. The configuration of the cams themselves, as well as the relative angular locations of their "rise" and "dwell" portions, will be readily understood, by those skilled in the art, from the ensuing description of the sequence or cycle of operation. One terminal of each of the switches 44–49 is connected to bus 40.

As may be deduced from the second line of FIG. 3, before the "program" or sequence or cycle of operation begins at time zero, valve 6 is closed. Since catalyst is flowing in line 1 at this time, catalyst enters the upper end of the larger sample pipe 2 from the catalyst seal leg 1. The flow of catalyst in pipe 2 is stopped by closed valve 6, so that the portion of pipe 2 which is upstream of valve 6 becomes filled with catalyst pellets. Manually-operated valve 3 is open, and manually-operated valve 5 is closed.

At the beginning of the cycle of operation, time zero, the cam-operated switch 44 closes, and this switch remains closed for about 7½ minutes (see the top line of FIG. 3). The closing of this switch energizes two timers 50 and 51, through obvious circuits. Timer 50 has a range of 0–30 seconds, and at the end of the time set thereon it opens the normally-closed switch 52, which latter is in series with solenoid 53 of solenoid valve 9 (and also in series with switch 44) across buses 40 and 41. Thus, solenoid 53 is energized at zero time (the start of the cycle, the closing of switch 44), and is deenergized at the end of the time set on timer 50. Valve 9 is supplied with air via a pipe 54, and operates to connect the air supply to only one of the two pipes 10 and 11 when solenoid 53 is energized, and to connect the air supply to only the other of the two pipes 10 and 11 when solenoid 53 is deenergized. The arrangement is such that air is supplied to the proper one of these two pipes to cause opening of valve 6 (FIG. 1) when solenoid 53 is energized (at zero time), and is supplied to the other of these two pipes (to cause closing of valve 6) when solenoid 53 is deenergized (at the end of the time set on timer 50).

The programmer thus opens valve 6 at zero minutes to start the cycle. At this time, all of the catalyst which had previously been trapped between valve 6 and the open upper end of conduit 2 must be withdrawn and dumped into waste bin 12 before a fresh or representative sample is obtained from the catalyst flow line 1. The length of pipe in which the catalyst had been trapped is about thirty inches. Timer 50 (which times the operation of valve 9, and thus also of valve 6) causes valve 6 to remain open long enough (about five seconds) to draw this fresh sample, then causes valve 6 to close. See the second line in FIG. 3.

Timer 51 has a range of 0–30 seconds, and at the end of the time set thereon it closes the normally-open switch 55, which latter is in series with a timer 56 (and also in series with switch 44) across buses 40 and 41. Thus, timer 56 is energized at the end of the time set on timer 51. Switch 55 remains closed until all the timers 50, 51, and 56 are reset by the opening of switch 44, at about time 7½ minutes from the beginning of the cycle of operation. Once timer 56 is started, at the end of the time set thereon it opens the normally-closed switch 57, which latter is in series with solenoid 58 of solenoid valve 17 (and also in series with switches 44 and 45) across buses 40 and 41. Thus, solenoid 58 is energized at the end of the time set on timer 51 (when switch 55 closes; see the third line in FIG. 3), and is deenergized at the end of the time set on timer 56. Valve 17 is supplied with air via a pipe 59 (which is connected to the same source as is pipe 54), and operates to connect the air supply to only one of the two pipes 18 and 19 when solenoid 58 is energized, and to connect the air supply to only the other of the two pipes 18 and 19 when solenoid 58 is deenergized. Air is supplied to the proper one of these two pipes to cause opening of valve 14 (FIG. 1) when solenoid 58 is energized, and is supplied to the other of these two pipes (to cause closing of valve 14) when solenoid 58 is deenergized. See the fourth line in FIG. 3.

As the tail end of the sample in pipe 2 slides past pipe 13 and valve 14, the energization of timer 56 (closing of switch 55) causes valve 14 to open, allowing this small portion (about seventy-five cubic centimeters) to drop into the sample pipe 13. It is restrained from further travel by valve 15, which is closed at this time (see the fifth line in FIG. 3) and which remains closed for about nine minutes after valve 14 closes. This period of time, during which the catalyst sample is trapped in pipe 13 above valve 15, is sufficient to allow the hot catalyst sample (temperature of approximately 1150° F. at seal leg 1) to cool to a substantially lower temperature (about 100° F.) prior to any further action on the sample. This lower temperature is one at which it is safe (i.e., for no damage to the apparatus) for the sample to enter the detector unit 27.

At the end of the cooling period, time 10.5 minutes from the beginning of the cycle, the cam-operated switch 49 closes, and this switch remains closed for about one minute. The closing of this switch energizes the operating winding 60 of a relay 61 having a pair of normally-open contacts 62. Contacts 62 are in a series power circuit which includes a manually-operated switch 63 (normally closed) and the pulverizer motor 25; thus, when contacts 62 close, the pulverizer motor 25 is energized. Pulverizer 24 is thus started at about time 10.5 minutes, and remains on as long as switch 49 is closed, i.e., until about time 11.5 minutes. See the bottom line in FIG. 3.

A few seconds after switch 49 closes, the cam-operated switch 45 closes, and this switch remains closed for about 1½ minutes. Switch 45 is connected in series wtih solenoid 64 of a solenoid valve 21 across buses 40 and 41. Thus, solenoid 64 is energized when switch 45 closes, and is deenergized when switch 45 opens. Valve 21 is supplied with air via a pipe 65 (which is connected to the same source as is pipe 54), and operates to connect the air supply to only one of the two pipes 22 and 23 when solenoid 64 is energized, and to connect the air supply to only the other of the two pipes 22 and 23 when solenoid 64 is deenergized. Air is supplied to the proper one of these two pipes to cause opening of valve 15 (FIG. 1) when solenoid 64 is energized, and is supplied to the other of these two pipes (to cause closing of valve 15) when solenoid 64 is deenergized. See the fifth line in FIG. 3.

Thus, a few seconds after the pulverizer 24 is started up (by energization of its motor 25), valve 15 opens and dumps the (now cooled) sample from pipe 13 into the pulverizer. The pulverizer is set (and operates) to pulverize the pelletized sample to about the particle size of fine sand.

The pulverized sample drops from the pulverizer 24 down into the sample holder 26 in the detector unit 27. It accumulates in this sample holder until it substantially fills the same, since valve 30 is closed at this time (shortly after time 10.5 minutes); see the seventh line in FIG. 3.

Figure 4:
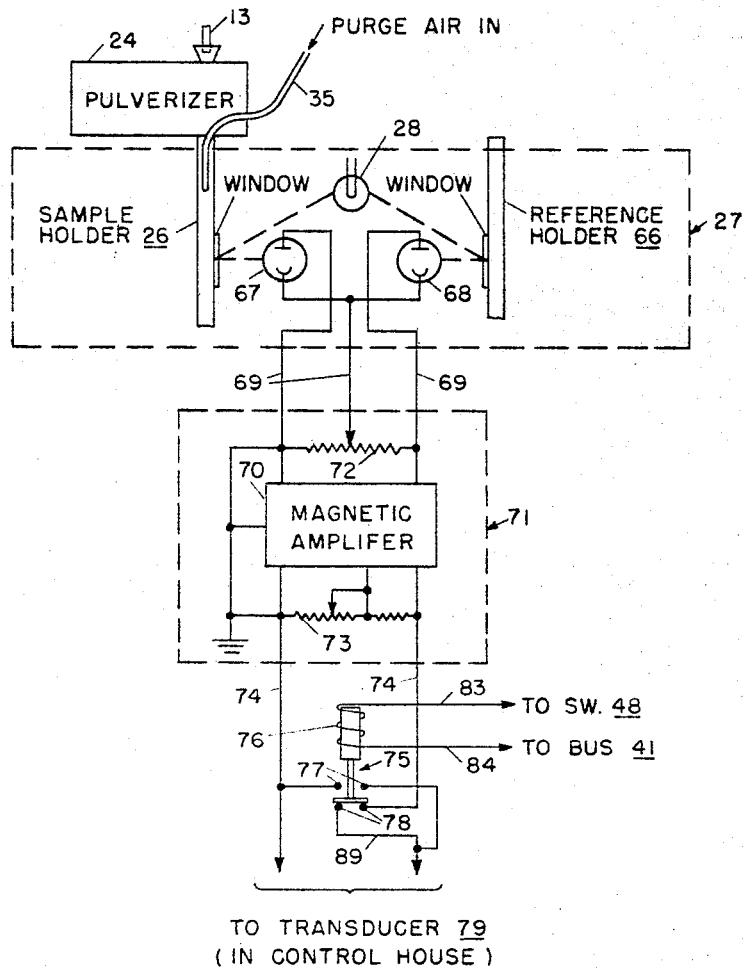
FIG. 4 is a circuit diagram of the detector unit and control unit portions of the apparatus.

Refer now to FIG. 4. The detector unit 27 also includes a reference holder 66, which may be similar in mechanical construction to the sample holder 26 but in which there is placed a reference standard, for example a piece of gray-toned cardboard. The reference holder 66 is a hollow cylinder or tube having end closures and having (like sample holder 26) a window through which may shine a light beam from lamp 28.

The reflectance of the pulverized catalyst is related to its coke content, or in other words to its residual carbon content. The detector unit 27 operates as a means for comparing the light-reflecting properties of the pulverized sample ( in sample holder 26) with those of a reference standard (in reference holder 66) to produce a signal proportional to the percentage of carbon on the sample.

In the detector unit 27, the lamp 28 (which is supplied from a source of voltage through voltage regulators, in order to keep the intensity of the produced light essentially constant) projects beams of light onto the sample holder 26 and simultaneously onto the reference holder 66 at angles of about 45°, as indicated by dotted lines in FIG. 4. The light reaches the material inside the holders through the respective windows in such holders. A photoelectric cell 67 is arranged to receive the diffused light reflected from the pulverized sample in holder 26, and a photoelectric cell 68 is arranged to receive the diffused light reflected from the reference standard in holder 66. By way of example, the cells 67 and 68 may be silicon photovoltaic cells, which produce a voltage output corresponding to the amount of light falling thereon. By means of three electrical leads 69, one of which is a common or "central" connection to both cells 67 and 68, the voltage outputs of the two photoelectric cells are differentially combined and applied to the input of a magnetic amplifier 70 contained in a control unit 71. This differential combination results in the production of a signal (applied to the input of amplifier 70) which is proportional to the percentage of carbon on the sample in holder 26, assuming the apparatus has previously been calibrated. This signal may be thought of as a difference signal, or an unbalance voltage.

An electrical "zero" adjustment is provided by connecting a potentiometer 72 between the two "outer" leads 69 (one of which is grounded, as shown in FIG. 4), and by connecting the common or "central" one of leads 69 to the movable arm on this potentiometer. This "zero" adjustment compensates for inequalities in the voltage output versus light of the phootvoltaic cells 67 and 68.

A "span" adjustment or gain control potentiometer 73 is connected across suitable output terminals of amplifier 70, to adjust the amount of negative feedback which is used in this amplifier. The output of the amplifier 70 (i.e., the amplified difference signal or "error" signal) then appears between leads 74, one of which (the negative lead) is grounded.

In order to reduce gain variation and zero output of the magnetic amplifier 70 to a negligible value with wide ambient temperature excursions, a thermostatically-controlled heater (not shown) is utilized in control unit 71, to prevent the amplifier from cooling below about 50° F.

At the field location, adjacent control unit 71, there is provided a recorder switching relay 75 having a coil 76 which, when energized, closes its normally-open contacts 77 to provide a short-circuit across the input of a millivolt-pressure transducer 79 (see FIG. 1) which is located in the control house. This results from the fact that one of the relay contacts 77 is connected to the negative amplifier output lead 74 previously referred to (which latter lead extends directly from the amplifier 70 to the transducer 79), and the other one of the relay contacts 77 is connected to the other (ungrounded) transducer input lead 89. When relay 75 is deenergized, its contacts 78 are closed (as illustrated in FIG. 4) to connect the ungrounded one of leads 74 to the ungrounded transducer input lead 89. Assuming the relay 75 is in the position illustrated in FIG. 4, the amplified unbalance voltage (output of amplifier 70) is transmitted to the control house via leads 74 and 89 and contacts 78, and is fed to the transducer 79. This transducer changes the signal from electrical to pneumatic in a proportional manner, so that the amount of the pneumatic signal is directly representative of the percent of residual carbon as measured in the detector unit 27, and the pneumatic signal is fed to a pneumatic recorder 80 (which, like transducer 79, is in the control house) to provide a chart record of the percentage of residual carbon on the catalyst sample.

Figure 5:
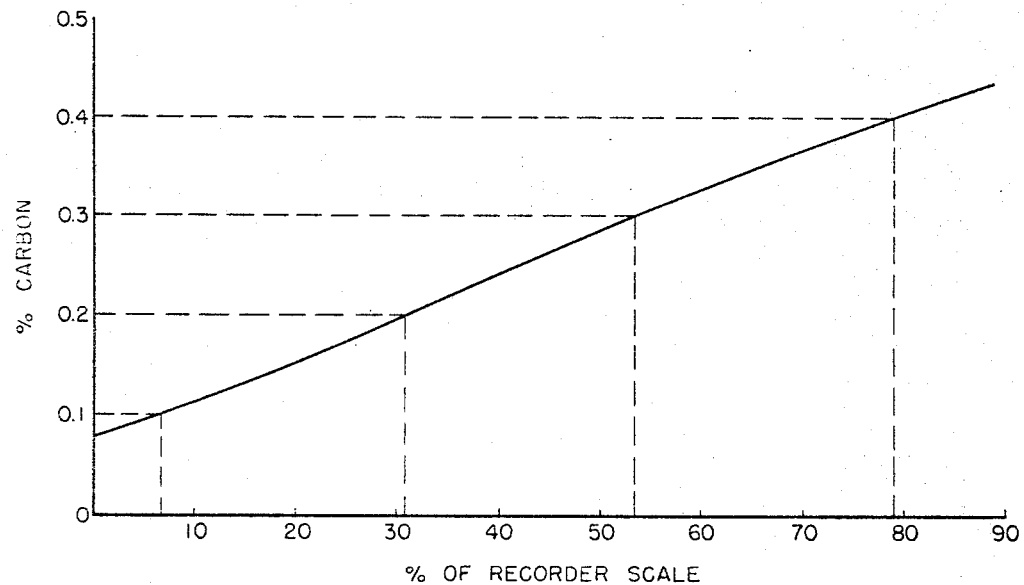
FIG. 5 is a typical calibration curve for the apparatus of the invention.

To calibrate the apparatus, the reference holder 66 should be filled with pulverized catalyst whose carbon content is that corresponding to the lower end of the desired range. The sample holder 26 should be filled (by way of pulverizer 24) with a similar catalyst, and the "zero" adjustment 72 rotated to produce zero output on the recorder. After supplying the pulverized catalyst to the holders 26 and 66, the pulverizer 24 should be run for three minutes, so the catalyst will pack in a normal manner. Thereafter, the sample holder 26 should be filled with catalyst whose carbon content corresponds to that of the upper end of the desired range, and the "span" adjustment 73 should be rotated to produce 100 millivolts at the transducer 79 (corresponding to a maximum reading on recorder 80). Catalyst with intermediate values of carbon content should then be placed in the sample holder 26, and intermediate points of the calibration curve determined. A typical calibration curve, in which recorder scale reading is plotted against percent carbon, is given in FIG. 5.

It would be possible to provide a direct electrical balancing voltage on the reference side of the apparatus, for differential combination with the voltage produced by the "sample" cell 67. To do this, the reference holder 66 and the "reference" cell 68 would be replaced by a stable reference voltage source, such as a Zener diode connected in stabilizing fashion across a suitable source of potential.

It has been stated above that valve 30 is closed when valve 15 is opened to pass the new sample into pulverizer 24 and on into the sample holder 26. Prior to this closing, valve 30 opens (as will now be described) for a time interval, to dump the sample from the previous cycle of operation into the sample effluent pipe 29, and thence into waste bin 12.

The cam-operated switch 46 (FIG. 2) closes at time nine minutes, and this switch remains closed for about 1¼ minutes. Switch 46 is in series with solenoid 81 of solenoid valve 32 across buses 40 and 41. Thus, solenoid 81 is energized at time nine minutes, and is deenergized at about time 10¼ minutes (from the beginning of the cycle of operation). Valve 32 is supplied with air via a pipe 82 (which is connected to the same source as is pipe 54), and operates to connect the air supply to only one of the two pipes 33 and 34 when solenoid 81 is energized, and to connect the air supply to only the other of the two pipes 33 and 34 when solenoid 81 is deenergized. Air is supplied to the proper one of these two pipes to cause opening of valve 30 (FIG. 1) when solenoid 81 is energized, and is supplied to the other of these two pipes (to cause closing of valve 30) when solenoid 81 is deenergized. Thus, valve 30 opens at time nine minutes, and closes at about time 10¼ minutes (prior to the opening of valve 15 at time 10½ minutes). See the fifth and seventh lines in FIG. 3.

The cam-operated switch 48 closes at time eight minutes (prior to the opening of valve 30 at time nine minutes), and this switch remains closed for about four minutes. Switch 48 is in series with a lead 83 which is connected to one end of relay coil 76 (FIG. 4), and the other end of this coil is connected via a lead 84 to bus 41. Thus, relay 75 is turned "on" at time eight minutes, and is turned "off" at time twelve minutes. See the ninth line in FIG. 3. When relay 75 is turned "on" or energized, its contacts 77 close to short-circuit the input leads 74, 89 to transducer 79; when this relay is turned "off" or deenergized, its contacts 78 close to provide a "normal" connection of the output of amplifier 70 to transducer 79, via leads 74 and 89.

Thus, about one minute before the used sample (from the previous cycle of operation) is dumped from sample holder 26 into effluent line 29, by the opening of valve 30 (at time nine minutes), the recorder 80 is cut off from the analyzer by the operation of the recorder switching relay 75 (which opens contacts 78), and the leads 74, 89 to the transducer 79 are short-circuited through contacts 77, so that the recorder 80 is then driven to zero. This signifies to the operator that no analysis is being made at this time, and he ignores this portion of the recorder chart. The purpose of disconnecting the recorder in this manner is to eliminate from the record the erratic response of the analyzer which is produced as the old sample is dumped and a fresh sample is admitted to the detector unit 27.

When valve 15 closes (at time twelve minutes) and the sample holder 26 has been filled with fresh sample, relay 75 is turned "off" to reconnect (through contacts 78) the amplifier output to transducer 79; the analysis of the new sample then takes place, and this is properly recorded.

The cam-operated switch 47 closes at time 9¼ minutes, and this switch remains closed for about ¾ minute. Switch 47 is in series with solenoid 85 of solenoid valve 36, across buses 40 and 41. Thus, solenoid 85 is energized as long as switch 47 is closed, causing valve 36 to be opened for this same length of time. See the eighth line in FIG. 3; it will be noted that valve 36 operates during the time that valve 30 is open. A stream of dry air (for purging) is supplied to valve 36 via a pipe 86, from a suitable source (which may be the same source used for pipe 54), and when valve 36 is open, this air is supplied to pulverizer 24 and sample holder 26 by way of line 35.

Thus, valve 30 is open (to dump the used sample to the waste bin 12 via effluent pipe 29), the programmer causes valve 36 to open, to admit a stream of dry air to both the pulverizer 24 and the sample holder 26 to purge therefrom any traces of old catalyst sample before a fresh sample is admitted (the latter beginning at time 10½ minutes, as previously described). Since valve 30 is open while valve 36 is open, the purged material can enter effluent pipe 39 and travel to bin 12. The purging stream to sample holder 26 provides a blast of clean, dry air against the inside of the window in this holder. This removes the fines (pulverized catalyst) which tends to adhere to the glass. The valve 36 closes at time ten minutes and the valve 30 closes at time 10¼ minutes, so both of these valves are closed when valve 15 open at time 10½ minutes to admit a new sample to the pulverizer and thence to holder 26.

The solenoid 87 of solenoid valve 38 is connected directly in parallel with solenoid 64, so that valve 38 operates concomitantly with valve 15, under the control of cam-operated switch 45. See the fifth and sixth lines in FIG. 3. A stream of dry air (for purging) is supplied to valve 38 via a pipe 88, from a suitable source (which may be the same source used for pipe 54), and when valve 38 is open, this air is supplied to the upper end of effluent pipe 29 by way of line 37.

Therefore, at time 10½ minutes, after valve 30 has closed (at time 10¼ minutes) and after the purge air in line 35 has been turned off (at time 10 minutes), valve 38 opens, to admit a stream of dry air to the sample effluent pipe 29. This purges the effluent pipe 29 to the waste bin 12, and prevents plugging of such pipe by the finely pulverized catalyst.

At time twelve minutes, all valves have closed, the switching relay 75 has been turned "off," and the various timers have been automatically reset to "start." At time fifteen minutes, the cycle is completed and a new cycle of operation begins.

The invention claimed is:

1. Apparatus for measuring the percentage of carbon on the catalyst used in a cracking process, comprising means for automatically abstracting, from a portion of the equipment used in said process, a sample of catalyst, means for pulverizing said sample, means for comparing the light-reflecting properties of the pulverized sample with those of a reference standard to produce a signal proportional to the percentage of carbon on the sample, and means for utilizing said signal.

2. Apparatus as set forth in claim 1, wherein said comparing means comprises means for projecting a light beam onto said sample and simultaneously onto said standard, two photoelectric cells one of which is arranged to receive the light reflected from the sample and the other of which is arranged to receive the light reflected from the standard, and means for differentially combining the outputs of said two cells.

3. Apparatus for measuring the percentage of carbon on the catalyst used in a cracking process, comprising means for automatically and periodically abstracting, from a portion of the equipment used in said process, a sample of catalyst, means for pulverizing each sample, means for comparing the light-reflecting properties of each pulverized sample with those of a reference standard to produce for each sample a signal proportional to the percentage of carbon on the respective sample, and means for utilizing said signals.

4. Apparatus as set forth in claim 3, wherein said comparing means comprises means for projecting a light beam onto the sample to be compared and simultaneously onto said standard, two photoelectric cells one of which is arranged to receive the light reflected from the sample and the other of which is arranged to receive the light reflected from the standard, and means for differentially combining the outputs of said two cells.

5. Apparatus for measuring the percentage of coke on a hot catalyst, comprising means for automatically abstracting a sample of hot catalyst, means operative, following the abstraction of said sample, to allow the sample to cool to a substantially lower temperature prior to any further action thereon, means for pulverizing the cooled sample, means for comparing the light-reflecting properties of the cooled, pulverized sample with those of a reference standard to produce a signal proportional to the percentage of coke on the sample, and means for utilizing said signal.

6. Apparatus as set forth in claim 5, wherein said comparing means comprises means for projecting a light beam onto said sample and simultaneously onto said standard, two photoelectric cells one of which is arranged to receive the light reflected from the sample and the other of which is arranged to receive the light reflected from the standard, and means for differentially combining the outputs of said two cells.

7. Apparatus for measuring and recording the percentage of residual carbon on the catalyst used in a continuous cracking process, comprising means for automatically abstracting, from a portion of the process equipment through which catalyst is moving, a fresh sample of the catalyst, means for pulverizing said sample, means for comparing the light-reflecting properties of the pulverized sample with those of a reference standard to produce a signal proportional to the percentage of residual carbon on the sample, and means for transmitting said signal to a recorder.

8. Apparatus for measuring and recording the percentage of residual carbon on the catalyst used in a continuous cracking process, comprising means for automatically and periodically abstracting, from a portion of the process equipment through which catalyst is moving, a fresh sample of the catalyst, means for pulverizing each sample, means for comparing the light-reflecting properties of each pulverized sample with those of a reference standard to produce for each sample a signal proportional to the percentage of residual carbon on the respective sample, and means for transmitting said signals to a recorder.

9. Apparatus for measuring the percentage of coke on a hot catalyst, comprising means for automatically and periodically abstracting a sample of hot catalyst, means operative, following the abstraction of each sample, to allow the respective sample to cool to a substantially lower temperature prior to any further action thereon, means for pulverizing each cooled sample, means for comparing the light-reflecting properties of each cooled, pulverized sample with those of a reference standard to produce for each sample a signal proportional to the percentage of coke on the respective sample, and means for utilizing said signals.

10. Apparatus as set forth in claim 9, wherein said comparing means comprises means for projecting a light beam onto the sample to be compared and simultaneously onto said standard, two photoelectric cells one of which is arranged to receive the light reflected from the sample and the other of which is arranged to receive the light reflected from the standard, and means for differentially combining the outputs of said two cells.

11. Apparatus for measuring the percentage of carbon on the catalyst used in a cracking process, comprising a valved conduit coupled to a catalyst flow line utilized in said process, automatically-operated means for opening the valve in said conduit to allow catalyst to flow thereinto from said line, a pulverizer coupled to said conduit to receive therefrom a catalyst sample, said pulverizer operating to pulverize the received sample; analyzing means coupled to said pulverizer to receive therefrom the pulverized sample, said analyzing means operating to compare the light-reflecting properties of the pulverized sample with those of a reference standard and to produce a signal proportional to the percentage of carbon on the sample; and utilization means coupled to receive the signal produced by said analyzing means.

12. Apparatus as defined in claim 11, wherein said analyzing means comprises means for projecting a light beam onto said sample and simultaneously onto said standard, two photoelectric cells one of which is arranged to receive the light reflected from the sample and the other of which is arranged to receive the light reflected from the standard, and means for differentially combining the outputs of said two cells.

13. Apparatus for measuring the percentage of coke on the hot catalyst used in a cracking process, comprising a valved conduit coupled to a catalyst flow line utilized in said process, automatically-operated means for opening the valve in said conduit to allow catalyst to flow thereinto from said line, a sample pipe coupled to said conduit, said pipe having near the downstream end thereof a valve which is closed at the time the first-mentioned valve is opened, thereby to trap a sample of hot catalyst in said pipe; a pulverizer coupled to the downstream end of said pipe to receive therefrom a catalyst sample, said pulverizer operating to pulverize the received sample; automatically-operated means for opening the valve in said sample pipe at a time interval following the closing of said first-mentioned valve sufficient to allow the trapped catalyst sample to cool to a substantially lower temperature before it reaches said pulverizer, analyzing means coupled to said pulverizer to receive therefrom the cooled, pulverized sample, said analyzing means operating to compare the light-reflecting properties of the cooled, pulverized sample with those of a reference standard and to produce a signal proportional to the percentage of coke on the sample; and utilization means coupled to receive the signal produced by said analyzing means.

14. Apparatus for measuring and recording the percentage of residual carbon on the catalyst used in a continuous cracking process, comprising a valved conduit coupled to a catalyst flow line utilized in said process, automatically-operated means for opening the valve in said conduit to allow a fresh sample of catalyst to flow thereinto from said line, a pulverizer coupled to said conduit to receive therefrom the sample, said pulverizer operating to pulverize the received sample; analyzing means coupled to said pulverizer to receive therefrom the pulverized sample, said analyzing means operating to compare the light-reflecting properties of the pulverized sample with those of a reference standard and to produce a signal proportional to the percentage of residual carbon on the sample; and means for transmitting said signal to a recorder.

15. Apparatus for measuring the percentage of carbon on the catalyst used in a cracking process, comprising a valved conduit coupled to a catalyst flow line utilized in said process, automatically-operated means for periodically opening the valve in said conduit to allow catalyst to periodically flow thereinto from said line, a pulverizer coupled to said conduit to receive therefrom each catalyst sample, said pulverizer operating to pulverize each received sample; analyzing means coupled to said pulverizer to receive therefrom each pulverized sample, said analyzing means operating to compare the light-reflecting properties of each pulverized sample with those of a reference standard and to produce for each sample a signal proportional to the percentage of carbon on the respective sample; and utilization means coupled to receive the signals produced by said analyzing means.

16. Apparatus as defined in claim 15, wherein said analyzing means comprises means for projecting a light beam onto the sample being compared and simultaneously onto said standard, two photoelectric cells one of which is arranged to receive the light reflected from the sample being compared and the other of which is arranged to receive the light reflected from the standard, and means for differentially combining the outputs of said two cells.

References Cited
UNITED STATES PATENTS

| | | | |
|---|---|---|---|
| 2,599,197 | 6/1952 | Prescott | 23—288 |
| 3,223,844 | 12/1965 | Weber | 250—218 |
| 3,233,781 | 2/1966 | Grubbs | 250—210 X |

WALTER STOLWEIN, *Primary Examiner.*

U.S. Cl. X.R.
250—210; 23—288